United States Patent [19]

Usowski

[11] 3,772,452

[45] Nov. 13, 1973

[54] ENCAPSULATED ELECTRICAL DEVICE

[75] Inventor: Anton Burr Usowski, Mequon, Wis.

[73] Assignee: Globe-Union Inc., Milwaukee, Wis.

[22] Filed: Apr. 17, 1972

[21] Appl. No.: 244,545

[52] U.S. Cl. ............ 174/52 PE, 222/572, 338/356, 338/275

[51] Int. Cl. ......................... H05k 5/06, H01c 1/02

[58] Field of Search .................... 174/50, 52 PE, 76; 164/335; 222/478, 572; 249/83, 91, 93, 94, 96, 97; 264/272; 336/96; 338/226, 252, 256, 257, 275, 311; 95/95

[56] References Cited

UNITED STATES PATENTS

| | | | |
|---|---|---|---|
| 289,951 | 12/1883 | Adams | 95/95 |
| 616,152 | 12/1898 | Smith | 95/95 |
| 1,444,435 | 2/1923 | Steinberger | 95/95 |
| 2,268,457 | 12/1941 | Moore | 95/95 |
| 370,159 | 9/1887 | Regester | 164/335 |
| 1,104,490 | 7/1914 | Glazier | 222/572 |
| 1,761,203 | 6/1930 | Fox | 174/52 PE UX |
| 2,151,282 | 3/1939 | Stamp | 249/96 |
| 2,914,600 | 11/1959 | Smith et al. | 174/52 PE |
| 3,221,089 | 11/1965 | Cotton | 174/52 PE X |
| 3,441,895 | 4/1969 | Schwartz | 338/256 |

FOREIGN PATENTS OR APPLICATIONS

| | | | |
|---|---|---|---|
| 637,703 | 1/1964 | Belgium | 222/572 |
| 530,904 | 10/1921 | France | 95/95 |
| 9,413 | 6/1890 | Great Britain | 95/95 |
| 18,132 | 11/1890 | Great Britain | 222/572 |
| 484,925 | 5/1938 | Great Britain | 317/258 |

*Primary Examiner*—Laramie E. Askin
*Attorney*—John Phillip Ryan et al.

[57] ABSTRACT

An encapsulated electrical device having an encapsulation tray which includes spout members extending from the sidewalls to facilitate the positioning of the lead wires during encapsulation of a substrate in the tray and also serves as a retaining means to prevent potting material from overflowing the walls of the tray. The spouts have constricting wall surfaces which facilitate a clamping action on the lead wires and slanted locating tabs are provided in the tray for positioning the substrate.

7 Claims, 4 Drawing Figures

ENCAPSULATED ELECTRICAL DEVICE

BACKGROUND OF THE INVENTION

This invention relates to a high resistance type electrical component and, more particularly, to a tray for encapsulating portions of lead wires and a substrate in a potting material wherein the tray facilitates the clamping of the wires during the encapsulation process and also provides a retaining means for the potting material.

Encapsulation trays of the type concerned with in this invention are described in U.S. Pat. No. 3,441,895 wherein lead wires for connection with a substrate are positioned through the sidewalls of a tray or are fed through restraining members and over the top of the sidewalls before encapsulation of the substrate. This type of tray device has posed problems wherein fast assembly is desired because the lead wires must be first placed through the restraining means or through a sleeve in the sidewall before or after being soldered to the substrate. This necessitates additional time and also might require the soldering operation to take place with the substrate in the tray. A further problem with the tray described in the foregoing U.S. patent is that during the filling of the tray with the potting material, it can either overflow out through the sleeve extending through the sidewall or the material can quickly overflow the sidewalls before the flow is stopped. An additional problem with the tray described in U.S. Pat. No. 3,441,895 requires an added step in forming the collar in the sidewall It is an object of the present invention to provide a novel encapsulation tray for an electronic component which is readily adaptable to production line procedures. It is another object of this invention to provide a tray for assembling electrical devices wherein the lead wires are firmly and securely positioned in the tray. It is still another object of the present invention to provide a tray device for encapsulating electronic components wherein overflow of potting material is obviated. It is yet another object of this invention to provide an encapsulation case for an electronic substrate wherein the substrate is readily positioned in the encapsulation case in a level manner.

SUMMARY OF THE INVENTION

The foregoing objects are accomplished and the shortcomings of the prior art are overcome by the present invention through the use of an encapsulation tray which includes spout or trough-like members extending from the sidewalls and in open communication with them. The spouts have a base which extends outwardly and upwardly toward the top of the tray and contains constrictions near the mouth of the spout so as to effect a clamping or wedging action on the lead-in wire during the encapsulation of the substrate. Locating tabs are disposed on the sidewalls of the tray to position and level the substrate within the confines of the tray. Projections extend from the floor of the tray to hold the substrate away from the floor. The spouts serve a dual function as a clamping means and also a means to prevent overflow of the potting material.

BRIEF DESCRIPTION OF THE DRAWINGS

A better understanding of the present encapsulation case will be accomplished by reference to the drawing wherein.

DESCRIPTION OF THE FIRST EMBODIMENT

Figures 1, 2, 4:
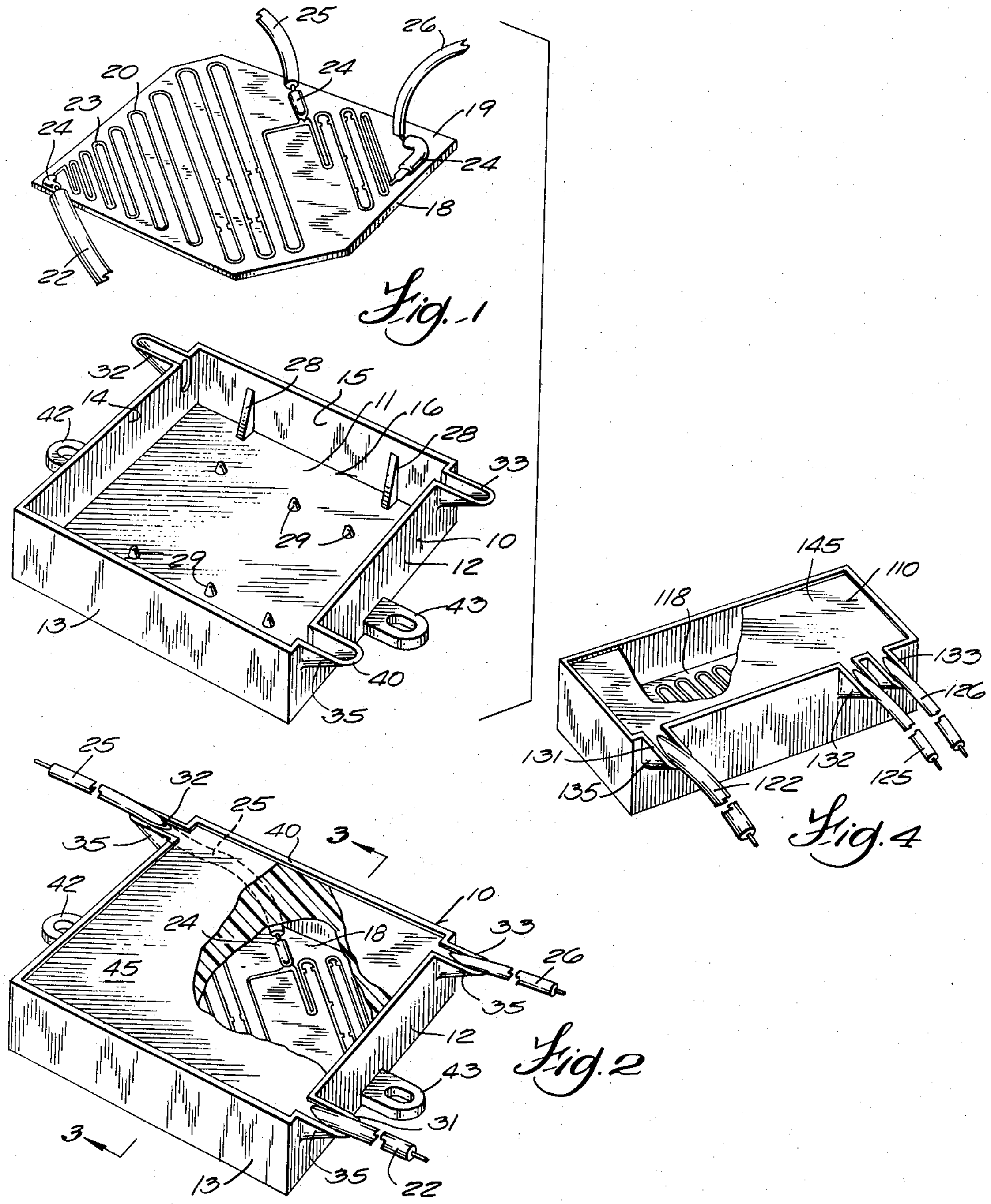
FIG. 1 is an assembly view in perspective of the encapsulation tray with a substrate having attached lead-in wires for positioning in the tray.
FIG. 2 is a perspective view showing the substrate encapsulated with potting material in the tray and lead-in wires positioned in the spouts with part of the potting material removed to illustrate the positioned wire.
FIG. 4 is a view similar to FIG. 2 but showing a modified form of the invention.

Proceeding to a detailed description of the present invention, the case or tray generally designated 10 has a floor 11 surrounded by four upstanding walls 12, 13, 14, and 15 to define a cavity 16. A ceramic type resistance module 18 is dimensioned to fit within the confines of the walls 12–15 and in cavity 16. The module is of the standard variety and is composed of a plate-like substrate 19 fabricated of a nonconductive material such as alumina. A paint-type resistance material 20 is deposited on the alumina in narrow strips which have a specific resistance per unit length. A high voltage input lead 22 is attached to the resistance path 23 such as by soldering at 24 on suitable soldering pads fabricated on the substrate 19. Similarly, conductor leads 25 and 26 are connected to resistance path 23 to effect lower voltage ratings with conductor 26 being lower than 25 with both leads connected as by soldering 24. With the conductor leads 22, 25, and 26 soldered onto the substrate 18 the subassembly will be placed in cavity 16 of tray 10 and will be guided toward the floor by means of lateral locating tabs 28 which extend along a portion of the sidewalls such as at 15 and a distance onto the floor 16. The substrate 18 will slide down along these tabs until it is wedged across them. This is best shown in FIG. 3 where it will also be noted that the substrate 18 will come to rest upon a series of projections 29 extending upwardly from the floor to hold the substrate a distance from it.

With the substrate 18 resting on projections 29, the lead wires 22, 25 and 26 will be oriented to be easily positioned and placed in spouts 31, 32, and 33, respectively. It will be noted in FIG. 1 that the spouts are in open communication with cavity 16 and extend through the respective sidewalls. The spouts extend outwardly from the sidewalls 12 and 14 and are open along the entire distance from the sidewall to the outward extremity of the spout. Each spout has a base 35 which extends both outwardly and away from the sidewall as well as the top of it in a tapering like manner to join the upper wall surface 40 and extend in a duckbill configuration. Securing flanges 42 and 43 are disposed on opposing walls 14 and 12, respectively, for later attachment such as in a television set.

Figure 3:
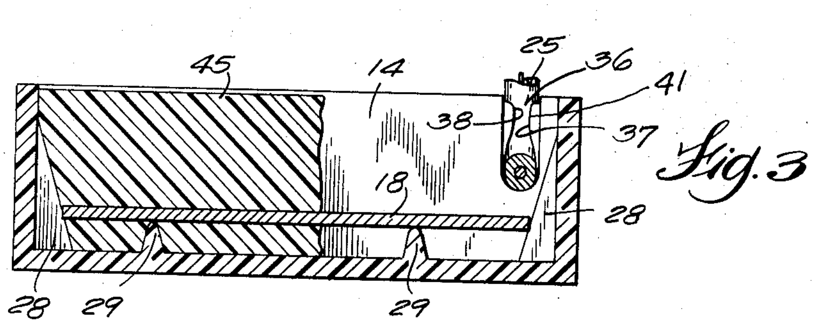
FIG. 3 is a view in vertical section taken along line 3—3 of FIG. 2 and illustrating the lead-in wire clamped in the spout as well as the substrate positioned in the tray.

As best shown in FIG. 3, all of the spouts have a constriction 36 in the portion immediately adjacent the sidewalls such as sidewall 14 with spout 32. The constrictions are formed by two opposing symmetrical sidewalls 37 and 38 which are generally U-shaped in configuration but with a narrowing portion 41 near the top or outer limits of the sidewall. This effects a greater degree of constriction on the lead wire such as 25 when it first enters the mouth of the constriction and then permits a small expansion for positive retention and will have the configuration as shown in FIG. 3 when it is fully positioned.

The embodiment shown in FIG. 4 is similar in most respects to that illustrated in FIGS. 1–3 except that is is narrower in configuration and has all three of the spouts disposed on the same sidewall. While not specifically shown, it has the internal locating tabs and projections such as 28 and 29. Accordingly, the same parts are designated with the same numbers except in the "100" series. Spouts 131, 132 and 133 will all have the spout constriction 36 such as described in FIG. 3.

OPERATION

A better understanding of the advantages of the tray 10 will be had by a description of its use during the potting of the substrate 18 in the tray. The substrate 18 will have lead wires 22, 25 and 26 soldered to it and will be placed in the tray as shown in FIG. 3. It will be held and located in a level manner between locating tabs 28 and on projections 29. The lead wires 22, 25, and 26 will be positioned in spouts 31, 32, and 33, respectively, with the wires constrained below constriction 36 as specifically shown in FIG. 3. With all of the wires and the substrate so disposed, the tray will then be completely filled with a potting material 45 which is of a high dielectric nature, and preferably a customarily used filled epoxy resin. The material will be deposited in the tray until it nears the upper limits of the walls 11, 12, 13, and 14. As the potting material nears the top of the tray, it will then flow outwardly and into the spouts 31, 32, and 33. This particular aspect of the material flowing outwardly in the spouts serves as a retaining or spill-over prevention means in that it permits excess material to gain entrance to the spouts in a gradual manner and thereby allow sufficient time to stop the flow of material into cavity 16.

The filling of tray 110 with substrate 118 would be in the same manner as described for tray 10.

Trays 10 and 110 are molded in the usual manner and preferably from a polypropylene material with spouts 31, 32 and 33 as well as tabs 28 and projections 29 integrally molded in the side walls. However, they could be molded from other thermoplastic or thermoresinous material such as polycarbonate. Similarly, other potting compounds rather than epoxies such as silicone resinous materials and polyurethanes could be utilized. The finished tray unit when filled with the potting material as shown in FIG. 2 is utilized in the manner described in U. S. Pat. No. 3,441,895 as a high voltage resistance module in a television set. It also would have uses as a bleeder resistor or voltage divider in any other equipment with a cathode ray tube. The tray unit is shown with spout members 31–33 in various positions on the tray. If desired, they could project from all four sides of a tray or alternatively, the tray could be formed in various geometric configurations instead of the rectangular configuration. Further, and as indicated in FIG. 1, spouts 31–33 have various widths to accommodate large and small diameter wires. They could be of one size if desired.

It will thus be seen that through the present invention there is now provided a tray member which is readily utilized in potting a substrate in an encapsulating-like manner which provides positive placement of the lead wires during the potting operation. The tray offers a distinct advantage of having spouts which accommodate and clamp the lead wires while also preventing overflow of the potting material by permitting the potting material to flow outwardly from the tray cavity as the level of the potting material nears the top of the tray. The tray further provides for positive placement of the substrate in the tray in a level manner. The tray is inexpensive to mold yet efficient to use during mass production.

The foregoing invention can now be practiced by those skilled in the art. Such skilled persons will know that the invention in not necessarily restricted to the particular embodiments presented herein. The scope of the invention is to be defined by the terms of the following claims as given meaning by the preceding description.

I claim:

1. An encapsulated electrical device comprising an electrical device having at least one lead wire secured thereto, a shallow, open, tray-like member having a floor and a surrounding sidewall forming a cavity, said cavity receiving said electrical device therewithin, at least one spout member having opposing sidewalls in open communication with said cavity and extending through said sidewall of said tray-like member, said spout extending outwardly and away from a portion of said sidewall opposite the floor in a tapering manner and being open along the entire distance from said sidewall to the outer extremity of said spout and receiving said lead wire, means disposed between the sidewalls of said spout to retain said wire in said spout, a potting material surrounding said electrical device and said wire in said spout, the surface of said spout including an end portion receiving and retaining sufficient potting material in said spout when said material reaches the upper limits of said tray to encapsulate said wire in said spout.

2. The encapsulated electrical device as defined in claim 1 wherein said means disposed in said spout to retain said wire in said spout includes two opposing constricting wall sections disposed substantially transversely in said spout in a symmetrical manner and extending a substantial distance across and along said spout with their narrowest constrictions near the outer limits of said sidewall.

3. The encapsulated electrical device as defined in claim 1 wherein locating tabs having slanted wall portions extend from the sidewall to the floor and across a portion of said floor.

4. The encapsulated electrical device as defined in claim 1 wherein projections extend from the floor to position the substrate away from the floor.

5. The encapsulated electrical device as defined in claim 1 wherein a multiplicity of said spouts extend from said wall.

6. The encapsulated electrical device as defined in claim 5 wherein said spouts have widths of different dimensions.

7. The encapsulated electrical device as defined in claim 1 wherein said tray has four sidewalls and a multiplicity of spouts, said tray being of a rectangular configuration with all of said spouts positioned on the same sidewall.

* * * * *